May 5, 1936. L. D. MILLS ET AL 2,039,656
PRECIPITATION OF CYANIDE SOLUTIONS
Original Filed Aug. 16, 1933
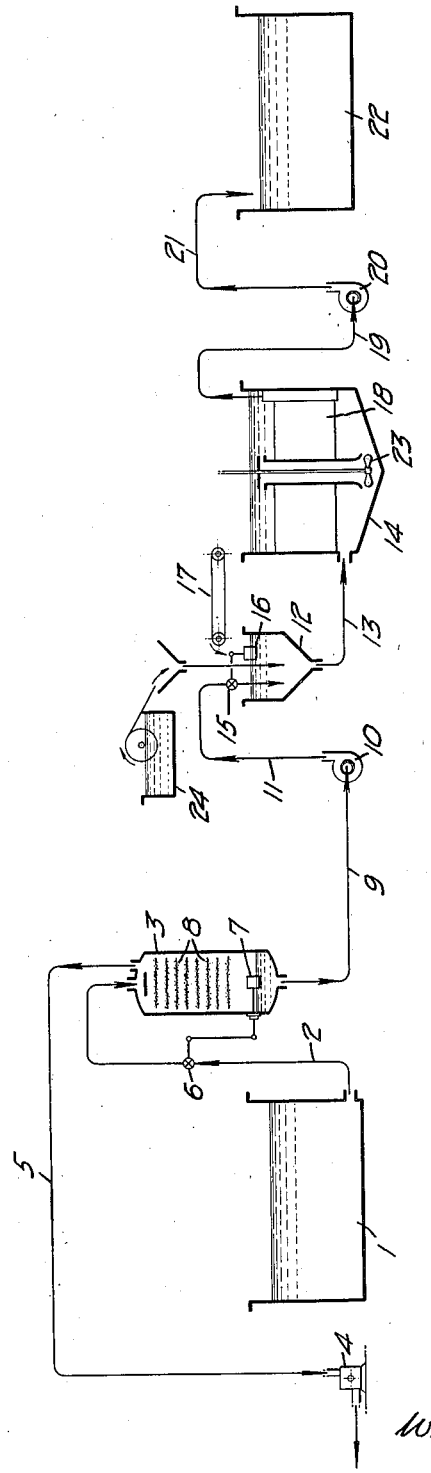
INVENTORS
Louis D. Mills
Thomas B. Crowe
BY
White, Prost, Flehr & Lothrop
ATTORNEYS Patented May 5, 1936

2,039,656

UNITED STATES PATENT OFFICE 2,039,656

PRECIPITATION OF CYANIDE SOLUTIONS

Louis D. Mills and Thomas B. Crowe, Palo Alto, Calif., assignors to The Merrill Company, San Francisco, Calif., a corporation of California Application August 16, 1933, Serial No. 685,354
Renewed October 2, 1935

7 Claims. (Cl. 75—107)

This invention relates generally to processes for the treatment of hydro-metallurgical solutions, particularly cyanide solutions containing gold and/or silver, to effect recovery of the desired precious metal. The term "cyanide solution" is used herein to designate aqueous solutions of alkaline cyanide and lime which are employed to dissolve the metals from their ores. Since gold is the principal metal to be precipitated, the term "gold" will be used herein synonymously with precious metals.

It is a general object of the present invention to provide a commercially practical process which will enable substantially complete precipitation of gold from various cyanide solutions.

A further object of the invention is to make possible efficient precipitation of gold from relatively weak cyanide solutions, even to the extent of enabling use of lower concentrations of alkaline cyanide than has heretofore been considered feasible.

A further object of the invention is to provide a process of the above character which is relatively economical with respect to the zinc dust or other chemical which may be employed, and with respect to the plant equipment required.

The advantages of removing oxygen from cyanide solutions prior to precipitation of the gold with metallic zinc, are well known and in general use throughout the world. Invariably the removal of the oxygen is accomplished by passing the solution thru a suitable vessel or receiver, the interior of the vessel being maintained in a state of partial vacuum by means of a vacuum pump. The cyanide solution is sprayed or filmed in the partial vacuum, thus effecting a partial removal of dissolved gases.

Due to practical limitations, as for example limitations upon the degree of vacuum obtainable with commercial apparatus, all of the oxygen cannot be removed by such mechanical treatment. In a typical example of what has been considered good practice, about 90% of the oxygen may be removed when operating at sea level upon solutions saturated with air, and with an applied partial vacuum corresponding to 28½ inches of mercury. A solution so treated will have about .82 mg. of oxygen per liter remaining in the solution, and going to precipitation. At higher elevations, as for example at an altitude of 6000 feet, the oxygen saturation of the solution is of course lower, and in such case if about 90% of the oxygen is removed by the mechanical treatment, approximately .67 mg. of oxygen per liter remains in the solution.

When the cyanide solution is sufficiently concentrated, that is if it contains sufficient free alkaline cyanide and hydroxyl alkali in the form of calcium hydrate, such residual amounts of oxygen referred to above do not seriously interfere with efficient precipitation of the gold by zinc. The action of the alkaline cyanide, and to a lesser extent of the calcium hydrate, upon metallic zinc precipitant, causes the generation of nascent hydrogen which combines with and nullifies the effect of the remaining oxygen. For example if the cyanide solution being precipitated contains from .005% to .01% or more of free potassium cyanide and approximately similar amounts of calcium hydrate, fairly efficient precipitation of the gold by metallic zinc is obtained in solutions for which approximately 90% of the oxygen has been removed by mechanical treatment, although even with such cyanide and lime concentrations, we have found that results can be improved by first removing all traces of oxygen, in accordance with the present invention.

In certain commercial mining operations it is frequently desirable to precipitate solutions containing no more than .0025% of potassium cyanide and sometimes even less, and with barely more than traces of hydroxyl alkali. From such solutions the gold is precipitated with great difficulty because the zinc precipitant is very slowly and only very slightly acted upon by the extremely weak cyanide and alkali present. If such solutions are treated by mechanical deaeration of the character previously described, the recovery of gold will be relatively inefficient, and excessive amounts of metallic zinc are required. We have discovered that this is due to the fact that the comparatively weak reaction upon the zinc precipitant, does not cause generation of nascent hydrogen to such extent as to nullify the effect of the remaining oxygen. In this connection it may be explained that the precipitation of gold by metallic zinc is essentially a reducing reaction which does not proceed to completion in the presence of free oxygen. We have also discovered that if these last traces of oxygen, after mechanical deaeration, are removed from the solution, the gold is readily precipitated by the zinc precipitant thus making possible efficient gold recovery, with a minimum amount of metallic zinc, and also making possible precipitation with zinc dust upon vacuum filter elements. As will be presently explained in greater detail, in our process a large part of the dissolved oxygen in the cyanide solution is first removed by mechanical means, and then the remaining traces of oxygen are removed by the use of a suitable chemical reducing agent, such as sodium or calcium hydrosulfite.

Referring now to the accompanying drawing for a detailed description of the process, we have shown a tank 1 for storing the clarified gold-bearing cyanide solution being precipitated. From tank 1 this solution is drawn thru pipe 2 into the receiver 3, the interior of which is maintained under a partial vacuum by means of the vacuum pump 4, connected to the receiver by pipe 5. Automatic regulation of the flow of solution into receiver 3 can be effected by means of a valve 6 operated by float 7, this float being positioned within the receiver. In passing downwardly thru the receiver 3, the solution flows over the grids 8, and is thus divided into thin films. The reduced pressure within the receiver causes a substantial part of the dissolved oxygen to leave the solution, to be then withdrawn from the receiver thru pipe 5, and to be exhausted by pump 4.

The partially deaerated solution is withdrawn from the receiver 3 thru pipe 9, by means of the pump 10. Pump 10 discharges thru pipe 11 into the mixing tank 12, which in turn delivers the solution thru pipe 13 into the filter tank 14. The stuffing box of the pump 10 can be submerged in a liquid seal to prevent ingress of air. The tops of both tanks 12 and 14 are shown located at the same level, and therefore the level of solution in these tanks can be controlled by regulating the solution level in tank 12. Such control has been indicated by way of valve 15 inserted in the pipe line 11, and operated by the float 16.

Positioned within the tank 14 and submerged beneath the solution are the filter elements 18, which are connected by pipe 19 to a pump 20. This pump in turn delivers the barren solution thru pipe 21 into the storage tank 22.

As the partially deaerated solution enters the mixing tank 12, accurately proportioned amounts of finely divided metallic zinc powder, known as "zinc dust", are introduced by means of feeder 17, and the mixture of solution and zinc dust passes thru pipe 13 into the tank 14, where the mixture is circulated over the filter elements 18 by means of agitator 23. As the solution is withdrawn thru the vacuum filter elements 18, by the action of pump 20, zinc dust in suspension in the solution is collected in a uniform layer on the surface of the filter elements. As the zinc dust is brought into contact with the cyanide solution in mixing tank 12, gold begins to precipitate upon the finely divided zinc and the reaction continues in the filter tank 14, being completed as the solution passes thru the layer of zinc on the filter elements 18. The precipitated or barren solution passes thru pipe 19, pump 20 and pipe 21 into the storage tank 22.

Where the solution contains appreciable amounts of cyanide, say .01% or more potassium cyanide per ton, the precipitation may be fairly rapid, but even with such solutions the gold is not completely precipitated until the solution is brought into intimate contact with the finely divided zinc on the surface of the filter elements. With very weak cyanide solutions which may contain .0025% potassium cyanide or even less, the precipitation proceeds very slowly, and if even traces of oxygen are present in the solution, may not be complete even in passing thru the layer of zinc on the filter elements.

To accomplish the removal of the last traces of oxygen in the solution we add accurately proportioned amounts of a chemical reducing agent to the solution entering mixing tank 12. Any one of several chemical compounds may be used, but we prefer to use sodium or calcium hydrosulfite. Aside from the fact that sodium or calcium hydrosulfites are readily procured and are relatively cheap commercial chemicals, they act rapidly to neutralize any traces of oxygen, and their reaction products in alkaline cyanide solutions are innocuous and do not in any way interfere with other steps of the cyanide process or with reuse of the barren solution.

We can add the hydrosulfite in the form of a dry salt, together with the zinc dust by means of the feeder 17, or in the form of an aqueous solution to the mixing tank 12 by means of the liquid feeder 24. The reaction between the hydrosulfite and the dissolved oxygen in the solution is very rapid, the hydrosulfite being oxidized in accordance with the following equation, assuming calcium hydrosulfite to be used:—

$$CaS_2O_4 + Ca(OH)_2 + O = 2CaSO_3 + H_2O$$

Subsequent to the operation of precipitation, and as the barren solution is resaturated with oxygen prior to its use in dissolving additional quantities of gold, the reaction product $CaSO_3$, calcium sulfite, is further oxidized to calcium sulfate in accordance with the following equation:—

$$CaSO_3 + O = CaSO_4$$

Neither calcium sulfite nor calcium sulfate have any deleterious effect on cyanide solutions. The latter is present in variable amounts in practically all cyanide solutions used in treating ores.

We claim:

1. In a process for the treatment of gold-bearing cyanide solution, where the solution is to be precipitated by zinc or a like metallic precipitant, effecting partial removal of oxygen from the solution by subjecting the same to a partial vacuum, and then removing all traces of remaining oxygen by introducing into the solution a non-precipitating chemical reducing agent other than the metallic precipitant.

2. In a process for the treatment of gold-bearing cyanide solutions, effecting partial removal of oxygen from the solution by subjecting the same to a partial vacuum, causing the solution so treated to flow thru elements of a filter, and introducing both zinc dust and a non-precipitating chemical reducing agent capable of neutralizing remaining traces of oxygen, into the solution, before delivery thereof to the filter and after said partial removal of oxygen.

3. In a process for the treatment of gold-bearing cyanide solutions, effecting partial removal of oxygen from the solution by subjecting the same to a partial vacuum, and then removing all traces of remaining oxygen from the solution by introducing into the same an alkali metal hydrosulfite.

4. In a process for the treatment of relatively weak gold-bearing cyanide solutions, as exemplified by a solution containing .0025% of potassium cyanide, effecting partial removal of oxygen from the solution by subjecting the same to a partial vacuum, introducing into the solution so treated zinc dust and also a non-precipitating chemical reducing agent capable of removing remaining traces of oxygen, and then causing the solution to flow thru filter elements for recovering gold therefrom.

5. In a process for the treatment of gold-bearing cyanide solutions, effecting partial removal of oxygen from the solution by subjecting the same to a partial vacuum, causing the solution so treated to flow through elements of a filter, and introducing both zinc dust and a non-precipitating chemical reducing agent capable of neutralizing remaining traces of oxygen, into the solution, before delivery thereof to the filter and after said partial removal of oxygen.

6. In a process for the treatment of cyanide solution containing dissolved precious metals, effecting precipitation of the precious metals by contacting the solution with metallic zinc while the solution contains an alkali sulphite salt capable of combining with dissolved oxygen.

7. In a process for the treatment of cyanide solution containing dissolved precious metals, effecting precipitation of the precious metals by contacting the solution with metallic zinc while the solution contains an alkali hydrosulphite.

LOUIS D. MILLS.
THOMAS B. CROWE.